UNITED STATES PATENT OFFICE.

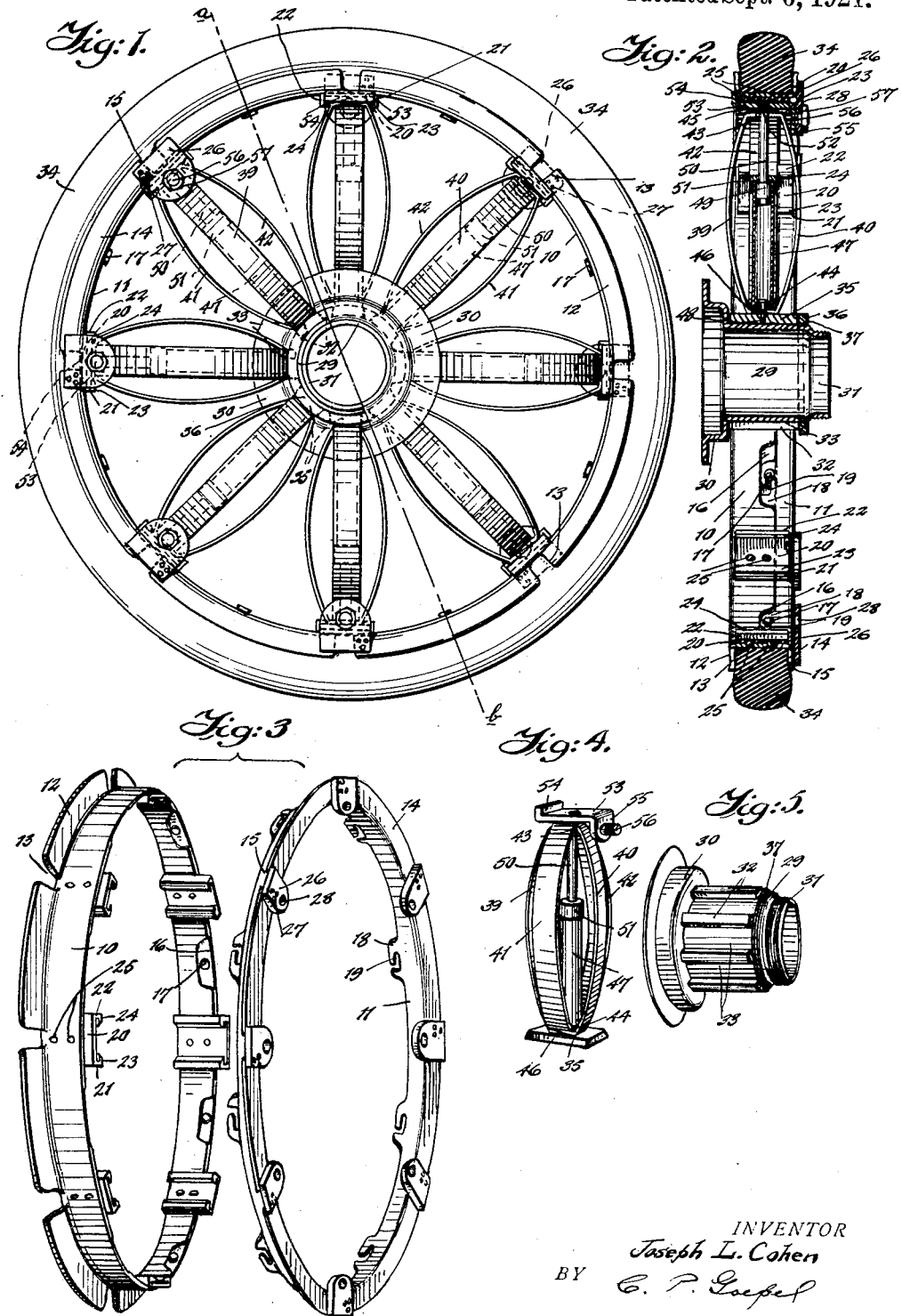

JOSEPH L. COHEN, OF NEW YORK, N. Y.

VEHICLE-WHEEL.

1,389,938.　　　　Specification of Letters Patent.　　Patented Sept. 6, 1921.

Application filed March 22, 1919. Serial No. 284,362.

*To all whom it may concern:*

Be it known that I, JOSEPH L. COHEN, a citizen of the United States, and a resident of the borough of Manhattan, in the city, county, and State of New York, have invented certain new and useful Improvements in Vehicle-Wheels, of which the following is a specification.

The present invention relates to improvements in vehicle wheels, and has for an object to provide a wheel having a relatively high degree of resiliency, and adapted to absorb shocks from the road and at the same time maintain the position of the axle, to the end that the shocks will be practically unfelt by the occupants of the car.

A further object is to provide a wheel in which suspension of the car will be substantially rigid while its support will be yieldable, so that although the axle will remain in a constant concentric relation to the suspension portion of the rim, that portion of the rim engaging the road will yield to variations in the road, and shocks therefrom will be taken up, isolated and absorbed in the supporting portion of the wheel with the result that the car will ride easily at all times. I propose to provide an improved tire carrying rim detachable from the spokes, and further to provide spokes detachable from the hub and having the advantage of permitting the carrying of an extra tire in condition at all times to be immediately used without the necessity of carrying an extra wheel. Further advantages are simplicity of construction, facility in the removal and renewal of tires, and economy both in the manufacture and cost of maintenance.

With these and other objects in view, an embodiment of my invention is shown in the accompanying drawings and this embodiment will be hereinafter more fully described with reference thereto, and the invention will be finally pointed out in the claims.

In the drawings:

Figure 1 is a side elevation of a vehicle wheel embodying one form of my invention, the half shown at one side of the center line *a—b* being the front side of the wheel, while the other half shows the reverse side;

Fig. 2 is a vertical sectional view through the wheel;

Fig. 3 is a perspective view of the two rim members and showing the same separated;

Fig. 4 is a perspective view of one of the spoke members removed from the wheel; and Fig. 5 is a perspective view of the hub.

Similar reference characters indicate corresponding parts throughout the several figures of the drawings.

Referring to the drawings, the embodiment of my invention shown therein comprises a rim consisting of two parts 10 and 11 formed of metal having a relatively high degree of resiliency to permit of local deflection thereof at the portion adjacent the road as will more fully hereinafter appear.

The rim portion 10 is relatively wider than the rim portion 11 and is provided at its outer side with a flange 12 having a plurality of spaced cut-outs 13 in line with the axes of the spoke members, these cut-outs extending to the lateral portion of the rim and being of sufficient width to permit of deflection of the rim. The rim portion 11 is provided with a flange 14 similar to the flange 12, and also provided with a plurality of spaced cut-outs 15.

At the inner side and adjacent the inner edge of the rim 10 there are provided in spaced relation and substantially intermediate the cut-outs 13, a plurality of recesses 16 open at their inner sides and having pins 17 disposed therein. Upon the inner edge of the rim 11 and opposed to the recesses 16 there are provided projecting portions 18 having their outer surfaces depressed relatively to the outer surface of the rim so that the projections may be engaged with the recesses 16 and at the same time the outer and inner surfaces of the two rim portions will be flush with each other. The projecting portions 18 are shorter than the recesses to permit of a small turning of the rims relatively to each other when engaged, and are provided with bayonet slots 19 adapted to engage the pins 17 and lock the rims together upon turning of one rim relatively to the other.

Channeled retaining members 20 having flanged longitudinal sides 21 and 22 bent inwardly as at 23 and 24, are secured to the inner side of the rim 10 by means of rivets 25 in line with the cut-outs 13 and extend from the outer side of the rim 10 to the outer side of the rim 11 when the rims are engaged, the said members for this purpose projecting beyond the inner edge of the rim 10. It will be understood that the members 20 may be secured by welding or other suitable processes, if desired.

A plurality of radially disposed lugs 26 are provided upon the flange 14 of the rim 11 and project over the cut-outs 15, being secured at one side thereof by means of rivets 27, the flange at the other side being free of the lugs so that the rim may be deflected locally. These lugs project inwardly over the ends of the channeled members 20 in the engaged relation of the rims and are provided with apertures 28 disposed radially inward of the channeled members.

The cylindrical hub 29 is provided at its inner end with a flange 30 and at its outer end is reduced and screw threaded as at 31 to receive a cap. Upon the cylindrical portion thereof there are formed a plurality of spaced longitudinal ribs having their sides inclined inwardly, providing therebetween longitudinal dovetail recesses 33 corresponding in number to and in radial alinement with the channeled retaining members 20.

The tire 34, which may be of any suitable type or shape, is disposed upon the rims 10 and 11 and is held in place by the flanges 12 and 14. In the case of clencher type or other special types of tires, it will be understood that the flanges 12 and 14 may be so designed as to accommodate them.

The spoke members each comprise a rectangular base 35 having outwardly inclined longitudinal sides, adapted to be slid into engagement with one of the recesses 33 and held in place upon the hub by means of a retaining ring 36 screwed upon the threaded portion 31 of the hub, adjacent the ends of the ribs 32. Secured to the base 35 and extending radially outwardly therefrom there are provided pairs of oppositely bowed spring members 39 and 40, 41 and 42, one pair being bowed in the plane of the wheel rim, while the other pair is in a radial plane passing through the axis of the hub. The spring members of each pair are preferably formed of one piece flattened intermediately their ends as at 43 and 44 and overlapping at their ends as at 45 and 46, the overlapping portions being beveled.

Within the spring members there is disposed a suspension supporting member yieldable under compression and comprising a cylindrical member 47 held at its base by means of a bolt 48 passing therethrough and through the ends of the spring members and screwed into the base 35. A piston 49 is slidably disposed in the member 47, the shaft 50 of which extends outwardly through the apertured cap 51 secured to the outer end of the said member, the outer end of the shaft being threaded as at 52, passing through the outer ends of the spring members and screwed into the rectangular spoke head 53. The head 53 is slidably engaged in the channeled member 20 and is bent upwardly at one end as at 54 to form an abutment to engage the inner edge of the rim. At the other end it is provided with a downwardly bent portion 55 adapted to register with the lug 26, disposed at the end of the member 20, and is provided with a threaded stud 56 adapted to engage the aperture 28 of the said lug 26 to secure the spoke member in place, the engagement of the studs 56 in the apertures of the lugs 26 also locking the position of the rim portions relatively to each other.

The bowed spring members 39 and 40 have a smaller degree of curvature than the spring members 41 and 42 and thus offer a greater resistance to compression.

The spoke members in the upper half of the wheel are rigid under suspension so that the hub at all times maintains a position concentric to the upper half of the rim. The spoke members in the lower half are capable of compression so that irregularities in the road will compress them, the rim being locally deflected with the result that shocks therefrom will be taken up and absorbed and entirely isolated from the hub.

Extra tires ready for use, may be carried upon rims similar to the rim of the wheel, and replaceable therewith by removal of the nuts 57 and disengagement of the wheel rim with the tire thereon from the spoke members. Thus, it is possible to carry extra tires ready for use without the necessity of carrying complete extra wheels. The wheel according to my invention, is light, economical and simple in construction, and will stand up under all ordinary conditions of use.

I have illustrated and described a preferred and satisfactory embodiment of my invention, but it is obvious that changes may be made therein within the spirit and scope thereof as defined in the appended claims.

I claim:

1. In a vehicle wheel, a hub, a rim, spoke members each comprising springs bowed in intersecting planes, and suspension supporting means associated with said springs.

2. In a vehicle wheel, a hub, a rim, and spoke members therebetween, each comprising spring means, and means connecting said hub and rim, said last named means being non-extensible from its normal position and adapted to be contracted from its normal position.

3. In a vehicle wheel, a hub, a resilient rim, and spoke members therebetween, each comprising spring means and means connecting said hub and said rim, said last named means being non-extensible from its normal position to prevent radial expansion of said rim and adapted to be contracted from its normal position to permit of local deflection of said rim.

4. In a wheel, a hub, a resilient rim provided with side flanges, a tire disposed upon said rim between said side flanges, and spoke members disposed between said hub and said rim, each comprising spring means and means connecting said hub and rim, said last named means being non-extensible from its normal position to prevent radial expansion of said rim and adapted to be contracted from its normal position, said flanges of said rim being provided with cut-out portions in alinement with the axes of said spoke members and adapted to permit said rim to be deflected locally contiguous to said spoke members as they are contracted.

5. In a vehicle wheel, a hub, a rim, and spoke members each comprising pairs of outwardly-bowed springs and attaching members securing the ends of the springs together at opposite ends of the spoke and adapted for interlocking engagement respectively with the hub and rim.

6. In a vehicle wheel, a hub having locking ribs, a rim having flanges with cut-away portions, locking members secured within the rim at said cut-away portions, spring spoke members having interlocking portions on opposite ends to engage said locking members of the hub and rim, and means carried by the outer interlocking portions of the spoke members for engaging opposite sides of the rim and for bridging the cut-away portions thereof.

7. In a vehicle wheel, a hub, a rim, spoke groups therebetween, each comprising a pair of oppositely bowed spring means disposed in the vertical plane of the rim, and a pair of oppositely bowed spring means in a plane at right angles thereto, and arranged about the same radial axis, the degree of curvature and tension of one pair of said bowed spring means being greater than the degree of curvature and tension of the other pair.

8. In a vehicle wheel, a hub, resilient spoke members, a tire carrying rim removably mounted on said spoke members, provided at its circumferential edges with tire retaining flanges, said flanges being provided with radially disposed cut-outs in spaced relation to each other, substantially in radial alinement with said resilient spoke members, and adapted to permit local deflection of said rim.

9. In a vehicle wheel, a hub, a plurality of resilient spoke members mounted on the hub and extending radially outward therefrom, a rim mounted directly on the outer ends of the spoke members and having outstanding tire engaging flanges interrupted at the points of connection of said rim with said spoke members to provide cut-away portions in the flanges, and means carried by the spoke members for engaging opposite sides of the rim and for bridging the cut-away portions of the flanges.

In testimony that I claim the foregoing as my invention, I have signed my name hereunder.

JOSEPH L. COHEN.